(12) United States Patent
Miura

(10) Patent No.: US 9,014,948 B2
(45) Date of Patent: Apr. 21, 2015

(54) CONTROL DEVICE FOR INTERNAL COMBUSTION ENGINE

(75) Inventor: Hajime Miura, Tama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 1102 days.

(21) Appl. No.: 12/818,597

(22) Filed: Jun. 18, 2010

(65) Prior Publication Data

US 2010/0332109 A1 Dec. 30, 2010

(30) Foreign Application Priority Data

Jun. 30, 2009 (JP) ................................. 2009-154988

(51) Int. Cl.
*F02D 35/02* (2006.01)
*F02D 41/04* (2006.01)
*F02D 41/06* (2006.01)
*F02D 41/40* (2006.01)
*F02B 75/12* (2006.01)

(52) U.S. Cl.
CPC .......... *F02D 35/025* (2013.01); *F02D 2250/08* (2013.01); *F02D 2250/11* (2013.01); *F02B 2075/125* (2013.01); *F02D 41/047* (2013.01); *F02D 41/064* (2013.01); *F02D 41/401* (2013.01); *Y02T 10/44* (2013.01); *Y02T 10/123* (2013.01)

(58) Field of Classification Search
CPC ............ F02D 2250/08; F02D 2250/11; F02D 41/401; F02D 35/025
USPC ......................................................... 701/105
See application file for complete search history.

(56) References Cited

U.S. PATENT DOCUMENTS 1,729,201 A * 9/1929 Attendu ...................... 123/27 R
2,001,843 A * 5/1935 Kasley ......................... 123/500

(Continued)

FOREIGN PATENT DOCUMENTS

JP      H07-286520      10/1995
JP      9-79066         3/1997

(Continued)

OTHER PUBLICATIONS

Toyota, Auto Shop 101, 2003, p. 2.*

*Primary Examiner* — Hieu T Vo
*Assistant Examiner* — Sherman Manley
(74) *Attorney, Agent, or Firm* — Drinker Biddle & Reath LLP

(57) ABSTRACT

A control device for an internal combustion engine of a spark-ignition type that injects fuel directly into a combustion chamber including a temperature detector that detects the temperature of the combustion chamber, a load detector that detects the load of the internal combustion engine, and a controller. The controller performs a first control when the temperature of the combustion chamber is lower than or equal to a predetermined temperature and the load of the internal combustion engine is higher than a predetermined load such that the timing of fuel injection is advanced compared with the timing when the load of the internal combustion engine is lower than or equal to the predetermined load.

15 Claims, 4 Drawing Sheets

(56) References Cited

U.S. PATENT DOCUMENTS

| | | | | |
|---|---|---|---|---|
| 3,312,209 | A * | 4/1967 | Chmura | 123/449 |
| 5,460,132 | A | 10/1995 | Ishiwata et al. | |
| 5,908,463 | A * | 6/1999 | Akazaki et al. | 701/104 |
| 6,651,617 | B2 * | 11/2003 | Sukegawa et al. | 123/305 |
| 6,918,371 | B2 * | 7/2005 | Shimazaki | 123/305 |
| 6,966,304 | B2 * | 11/2005 | Nagaishi et al. | 123/480 |
| 2002/0007817 | A1 * | 1/2002 | Ueda et al. | 123/295 |
| 2004/0181331 | A1 * | 9/2004 | Nagaishi et al. | 701/104 |
| 2008/0078169 | A1 * | 4/2008 | Ishibashi | 60/287 |

FOREIGN PATENT DOCUMENTS

| | | |
|---|---|---|
| JP | 9-317521 | 9/1997 |
| JP | 10-176562 | 6/1998 |
| JP | 11-336595 | 12/1999 |
| JP | 2001012286 A | 1/2001 |
| JP | 2002-013428 | 1/2002 |
| JP | 2003-322044 | 11/2003 |
| JP | 2004019578 A | 1/2004 |
| JP | 2004-293368 | 10/2004 |
| JP | 2005-127224 | 5/2005 |

* cited by examiner

CONTROL DEVICE FOR INTERNAL COMBUSTION ENGINE

CROSS-REFERENCE TO RELATED APPLICATIONS

This application claims priority under 35 U.S.C. §119 to Japanese Patent Application No. 2009-154988, filed on Jun. 30, 2009, which is incorporated by reference herein in its entirety.

BACKGROUND OF THE INVENTION

1. Field of Invention

The present invention relates to control devices for internal combustion engines.

2. Description of Related Art

Direct-injection compression-ignition engines, typified by diesel engines, are known in which fuel injection timing is advanced for premixed combustion in order to reduce emissions of nitrogen oxides (NOx) and particulate matter while the ignition timing is kept approximately at top dead center (TDC) of the piston so that degradation of fuel efficiency is suppressed.

However, when the fuel injection timing is advanced in a direct-injection spark-ignition engine, part of the fuel adheres to the crown surface of the piston, and burns without being vaporized. This leads to an increase in the amount of particulate matter emitted by the engine. Conversely, when the fuel injection timing is delayed, part of the fuel directly hits the wall of the cylinder bore and adheres thereto since the piston is located at a low position remote from TDC. The adhered fuel is scraped off into the oil pan by the movement of the piston, and disadvantageously dilutes the engine oil.

SUMMARY OF THE INVENTION

In an embodiment, the invention provides a control device for an internal combustion engine of a spark-ignition type that injects fuel directly into a combustion chamber. The control device includes a temperature detector that detects the temperature of the combustion chamber, a load detector that detects the load of the internal combustion engine, and a controller. The controller performs a first control when the temperature of the combustion chamber is lower than or equal to a predetermined temperature and the load of the internal combustion engine is higher than a predetermined load such that the timing of fuel injection is advanced compared with the timing when the load of the internal combustion engine is lower than or equal to the predetermined load.

In another embodiment, the invention provides a method for controlling an internal combustion engine of a spark-ignition type that injects fuel directly into a combustion chamber. The method includes detecting the temperature of the combustion chamber, detecting the load of the internal combustion engine, and advancing the timing of fuel injection when the temperature of the combustion chamber is lower than or equal to a predetermined temperature and the load of the internal combustion engine is higher than a predetermined load as compared with the timing when the load of the internal combustion engine is lower than or equal to the predetermined load.

An object of the invention is to provide a control device for an internal combustion engine capable of appropriately controlling particulate matter emission and engine oil dilution in accordance with operational conditions.

The present invention solves the above-described problems by advancing the fuel injection timing when the temperature of the combustion chamber is low and the load of the internal combustion engine is high compared with the timing when the load is low, and by delaying the fuel injection timing when temperature of the combustion chamber is low and the load is low.

According to the present invention, the fuel injection timing is advanced when the temperature of the combustion chamber is low and the load is high. By advancing the fuel injection timing, adhering of fuel to the wall of the cylinder bore can be suppressed even when the amount of injected fuel is increased with the load. As a result, engine oil dilution can be suppressed.

On the other hand, the fuel injection timing is delayed when the temperature of the combustion chamber is low and the load is low. By delaying the fuel injection timing, adhering of fuel to the crown surface of the piston can be suppressed. As a result, particulate matter emission can be reduced.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
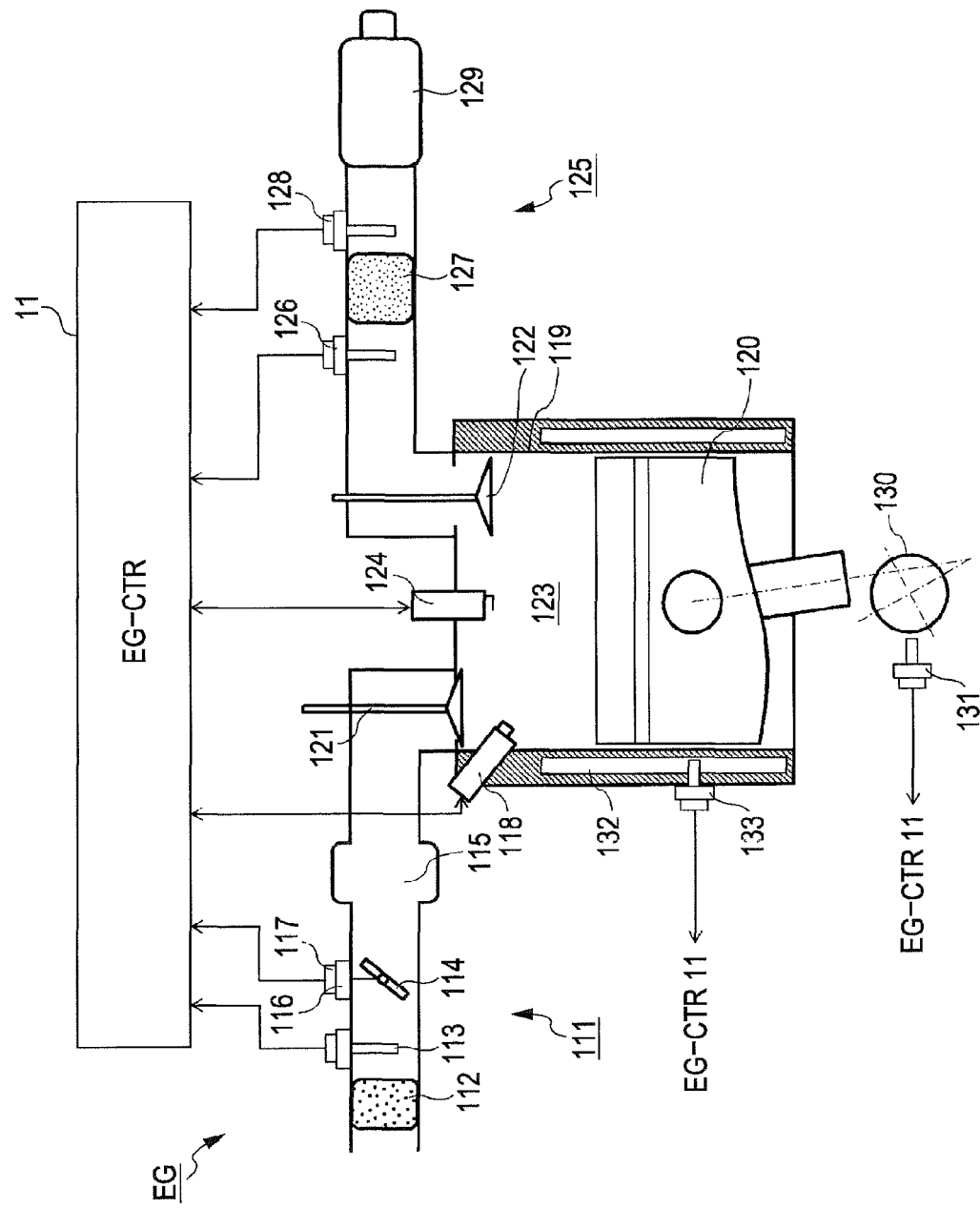
FIG. 1 is a block diagram illustrating an internal combustion engine into which an embodiment of the present invention is incorporated.

FIG. 1 is a block diagram illustrating an internal combustion engine into which a first embodiment of the present invention is incorporated, that is, the control device according to the first embodiment of the present invention is incorporated in a so-called direct-injection spark-ignition engine EG.

As shown in FIG. 1, the engine EG includes an intake path 111 having an air filter 112, an air flow meter 113 that detects the flow rate of intake air, a throttle valve 114 that controls the flow rate of the intake air, and a collector 115.

The throttle valve 114 is provided with an actuator 116 such as a DC motor that adjusts the opening of the throttle valve 114. This throttle valve actuator 116 electronically controls the opening of the throttle valve 114 on the basis of driving signals from an engine control unit 11 so that a required torque calculated from, for example, inputs to the accelerator by a driver is achieved. Moreover, a throttle sensor 117 detects the opening of the throttle valve 114, and outputs the detected signals to the engine control unit 11. The throttle sensor 117 can also function as an idle switch.

A fuel injection valve 118 faces a combustion chamber 123. The fuel injection valve 118 is opened in accordance with driving pulses set in the engine control unit 11, and directly injects fuel, pumped from a fuel pump (not shown) and having a predetermined pressure controlled by a pressure regulator (not shown), into a cylinder 119. This control will be described in more detail below.

The cylinder 119, the crown surface of a piston 120 that reciprocates inside the cylinder, and a cylinder head, including an intake valve 121 and an exhaust valve 122, constitute the combustion chamber 123. A spark plug 124 faces the combustion chamber 123 of the corresponding cylinder, and ignites the intake air-fuel mixture on the basis of ignition signals from the engine control unit 11.

An exhaust path 125 from the combustion chamber 123 has an air-fuel ratio sensor 126 that detects the air-fuel ratio of the exhaust gas and consequently that of the intake air-fuel mixture by detecting the concentration of a specific component such as oxygen in the exhaust gas. Signals detected by the air-fuel ratio sensor 126 are output to the engine control unit 11. The air-fuel ratio sensor 126 can include, for example, an oxygen sensor that outputs the rich/lean state of the mixture and a wide-range air-fuel ratio sensor that linearly detects the air-fuel ratio over a wide range of ratios.

Moreover, the exhaust path 125 has an exhaust-gas purifying catalyst 127 that purifies the exhaust gas. The exhaust-gas purifying catalyst 127 can include, for example, a three-way catalyst capable of oxidizing carbon monoxide (CO) and hydrocarbons (HCs) in the exhaust gas in the vicinity of stoichiometry (i.e., at a theoretical air-fuel ratio=1, (air weight)/(fuel weight)=14.7) and capable of purifying the exhaust gas by deoxidizing nitrogen oxide (NOx), and an oxidation catalyst capable of oxidizing CO and HCs in the exhaust gas.

The exhaust path 125 also has an oxygen sensor 128 that detects the concentration of a specific component such as oxygen in the exhaust gas and outputs the rich/lean state of the gas downstream of the exhaust-gas purifying catalyst 127, and signals detected by the oxygen sensor 128 are output to the engine control unit 11. The air-fuel ratio feedback control performed on the basis of values detected by the air-fuel ratio sensor 126 is corrected using values detected by the downstream oxygen sensor 128 so that, for example, control errors caused by deterioration of the air-fuel ratio sensor 126 are suppressed (using a so-called double air-fuel ratio sensor system). When the air-fuel ratio feedback control is performed based only on the values detected by the air-fuel ratio sensor 126, the oxygen sensor 128 is not necessary.

Reference number 129 in FIG. 1 denotes a muffler.

A crank angle sensor 131 is provided for a crankshaft 130 of the engine EG. The engine control unit 11 counts unit crank-angle signals output from the crank angle sensor 131 in synchronization with engine rotation for a predetermined period of time or measures cycles of reference crank-angle signals so that the rotational speed Ne of the engine is detected.

A water temperature sensor 133 is mounted in a cooling jacket 132 of the engine EG. The sensor detects the temperature Tw of cooling water inside the cooling jacket 132, and outputs the value to the engine control unit 11.

During uniform combustion control in which fuel is injected during the intake stroke and uniformly mixed with air for combustion, the fuel is injected into the combustion chamber 123 at a timing occurring at, for example, 80° to 90° after top dead center (ATDC). When the fuel injection timing in the intake stroke is delayed, part of the fuel directly hits the wall of the cylinder 119 and adheres thereto since the piston 120 is located at a low position remote from top dead center (TDC) when the fuel is injected. The adhered fuel is scraped off into an oil pan by the movement of the piston 120, and is prone to diluting the engine oil. Therefore, the fuel injection timing needs to be advanced in order to suppress the engine oil dilution.

However, when the fuel injection timing is advanced, part of the fuel adheres to the crown surface of the piston 120 since the piston 120 is located at a position near to TDC when the fuel is injected. The fuel burns without being vaporized, and may cause an increase in the amount of particulate matter in the exhaust. That is, suppression of the engine oil dilution and suppression of the particulate matter emission conflict with each other when being controlled using the fuel injection timing.

However, the particulate matter emission mainly presents a problem when the temperature of the combustion chamber 123 is low (cold state) while the engine oil dilution mainly presents a problem when the engine is operating under a high load, that is, the amount of injected fuel is large. On the basis of these findings, the engine control unit 11 according to this embodiment switches the control map for fuel injection timing in accordance with the temperature of the combustion chamber 123.

The temperature of the engine cooling water detected by the water temperature sensor 133 can be used to estimate the temperature of the combustion chamber 123. Alternatively, the temperature of the engine oil detected by an additional sensor can be used. Yet alternatively, the wall temperature of the cylinder 119, for example, can be estimated on the basis of the operating history of the engine from the start. Hereinafter, a temperature obtained by multiplying the temperature of the cooling water detected by the water temperature sensor 133 by a predetermined conversion factor is used for the temperature of the combustion chamber 123.

Figure 2:
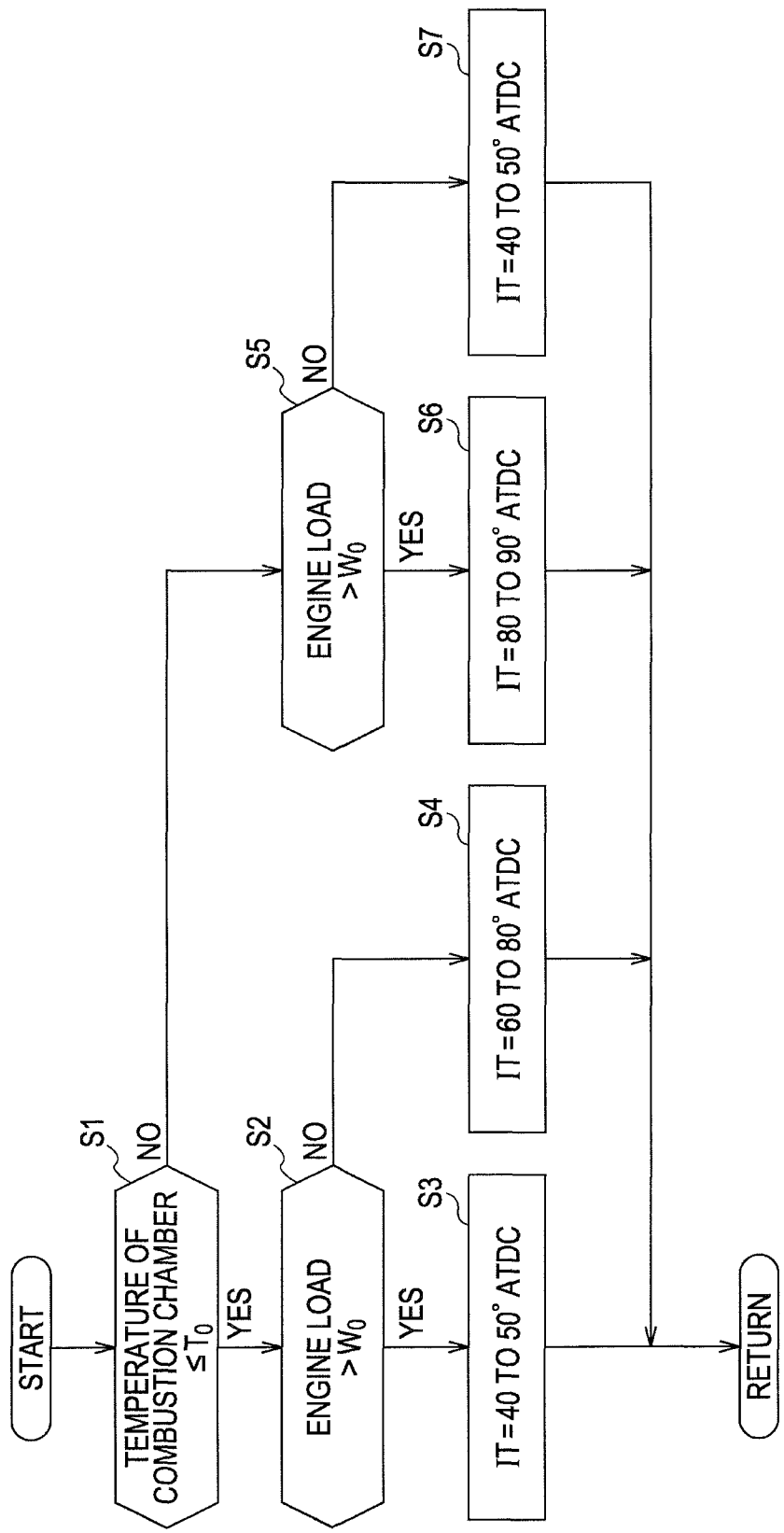
FIG. 2 is a flow chart illustrating a procedure for fuel injection control performed by an engine controller shown in FIG. 1.

Next, a control procedure will be described. FIG. 2 is a flow chart illustrating a procedure for fuel injection control in the intake stroke performed by the engine controller 11.

In step S1, it is determined whether or not the temperature of the combustion chamber 123, determined from the temperature of the cooling water detected by the water temperature sensor 133, is lower than or equal to a predetermined temperature T0 set in advance. When the measured temperature of the combustion chamber 123 is lower than or equal to the predetermined temperature T0, that is, when the engine EG is in the cold state, the process proceeds to step S2. When the temperature is higher than the predetermined temperature T0, that is, the engine EG is in a warm state, the process proceeds to step S5.

Figure 4:
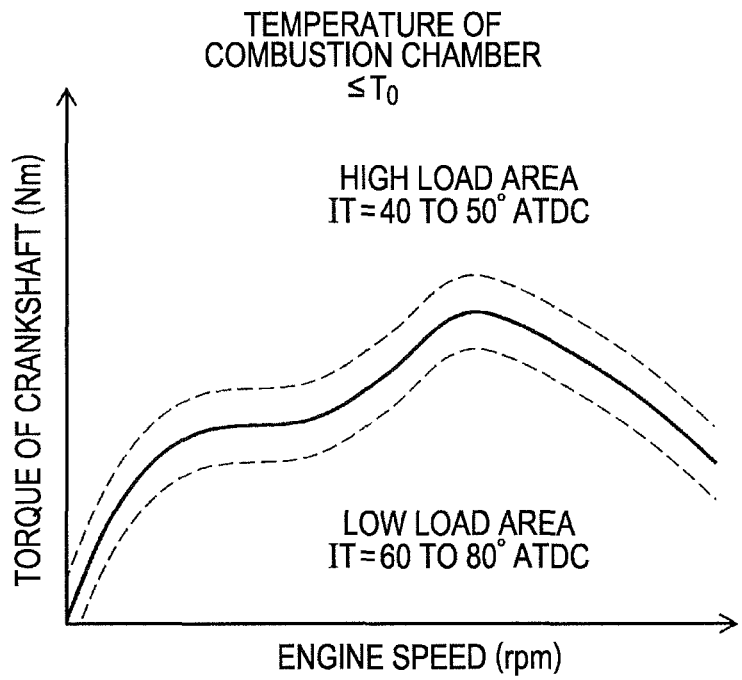
FIG. 4 is a control map illustrating the fuel injection timing in a torque characteristic diagram when the temperature of the combustion chamber is low.

In step S2, it is determined whether or not the engine load is higher than a predetermined load W0 set in advance. FIG. 4 is a control map illustrating the fuel injection timing in a torque characteristic diagram when the temperature of the combustion chamber is low (while the engine is in the cold state). In FIG. 4, a solid line is a threshold curve (predetermined load) indicating a threshold at which the fuel injection timing is to be switched. An area above the solid line is a high load area, and an area below the solid line is a low load area. Moreover, an area between dotted lines in FIG. 4 is a buffer area for switching the fuel injection timing between the high load area and the low load area. This area allows moderate switching of the fuel injection timing, and suppresses steps in torque.

In step S2, it is determined whether the current engine load is in the high load area or in the low load area by referring to the control map shown in FIG. 4, based on the number of revolutions of the engine detected by the crank angle sensor 131 and the torque of the crankshaft 130 detected by a torque sensor (not shown).

When the current engine load is in the high load area higher than the predetermined load W0 as a result of the determination in step S2, the process proceeds to step S3. When the current engine load is in the low load area lower than or equal to the predetermined load W0, the process proceeds to step S4.

In step S3, the fuel injection timing is advanced to, for example, 40° to 50° ATDC so that engine oil dilution is suppressed. Because the amount of injected fuel is large in the high load area, the amount of fuel adhered to the wall of the cylinder 119 becomes large. However, the particulate matter emission is relatively reduced since the combustion energy is high in the high load area. Therefore, the amount of fuel that adheres to the wall of the cylinder 119 and dilutes the engine oil can be reduced by advancing the fuel injection timing.

On the other hand, in step S4, the fuel injection timing is delayed to, for example, 60° to 80° ATDC so that formation of particulate matter emission is suppressed. Because the combustion energy is low in the low load area, the particulate matter emission is increased. However, the amount of fuel adhered to the wall of the cylinder 119 is relatively reduced since the amount of injected fuel is small in the low load area. Therefore, an increase in the particulate matter caused by fuel adhered to the crown surface of the piston 120 and burned without being vaporized can be suppressed by delaying the fuel injection timing. The control including steps S1 to S4 is referred to as a first control mode.

The process returns to step S1. When the temperature of the combustion chamber 123 is higher than the predetermined temperature T0, that is, when the engine EG is in a warm state, the process proceeds to step S5.

Figure 5:
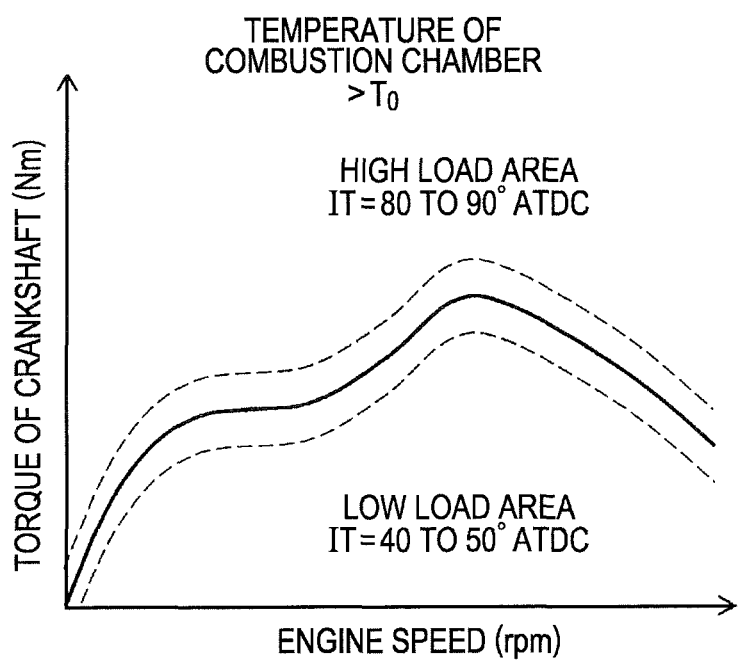
FIG. 5 is a control map illustrating the fuel injection timing in a torque characteristic diagram when the temperature of the combustion chamber is high.

In step S5, it is determined whether or not the engine load is higher than the predetermined load W0 set in advance. FIG. 5 is a control map illustrating the fuel injection timing in a torque characteristic diagram when the temperature of the combustion chamber is high (while the engine is in the warm state). In FIG. 5, a solid line is a threshold curve (predetermined load) indicating a threshold at which the fuel injection timing is to be switched. An area above the solid line is a high load area, and an area below the solid line is a low load area. Moreover, an area between dotted lines in FIG. 5 is a buffer area for switching the fuel injection timing between the high load area and the low load area. This area allows moderate switching of the fuel injection timing to suppresses steps in torque. The value of the threshold curve shown by the solid line in FIG. 4 can differ from that of the threshold curve shown by the solid line in FIG. 5.

In step S5, it is determined whether the current engine load is in the high load area or in the low load area by referring to the control map shown in FIG. 5 based on the number of revolutions of the engine detected by the crank angle sensor 131 and the torque of the crankshaft 130 detected by the torque sensor (not shown).

When the current engine load is in the high load area higher than the predetermined load W0 as a result of the determination in step S5, the process proceeds to step S6. When the current engine load is in the low load area lower than or equal to the predetermined load W0, the process proceeds to step S7.

In step S6, the fuel injection timing is set to, for example, 80° to 90° ATDC, which is a steady state, and the engine operates under a high load in the warm state.

In contrast, in step S7, the fuel injection timing is advanced to, for example, 40° to 50° ATDC so that the engine oil dilution is suppressed while the fuel efficiency and the combustion efficiency are improved. When the temperature of the combustion chamber 123 is high, the fuel adhered to the crown surface of the piston 120 is promoted to be vaporized, and the particulate matter emission does not cause serious problems. Therefore, suppression of the engine oil dilution can be achieved along with improvements in the fuel efficiency and the combustion efficiency. The control including steps S1 and S5 to S7 is referred to as a second control mode.

During the control routine shown in FIG. 2, uniform combustion control in which fuel is injected in the intake stroke is performed.

Figure 3:
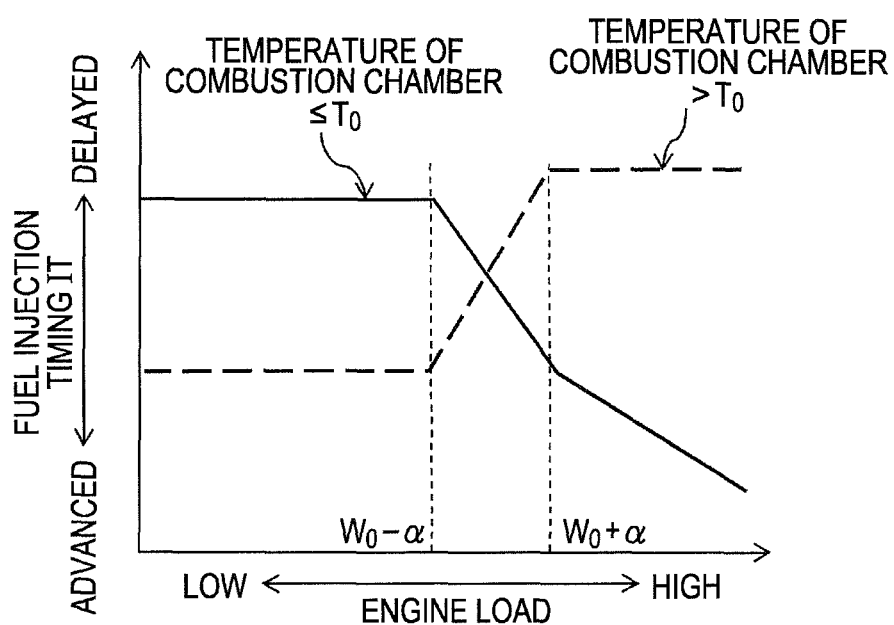
FIG. 3 is a control map illustrating relationships between the engine load and the fuel injection timing in the control shown in FIG. 2.

FIG. 3 is a control map illustrating a relationship between the engine load and the fuel injection timing when the temperature of the combustion chamber is high (dotted line) and that when the temperature of the combustion chamber is low (solid line).

In the case where the temperature of the combustion chamber is low shown by the solid line in FIG. 3, the fuel injection timing is delayed when the engine load is lower than a lower limit of $W0-\alpha$, and the fuel injection timing is advanced when the engine load is higher than an upper limit of $W0+\alpha$. The value of $\alpha$ represents a buffer area about the predetermined load W0.

Although the fuel injection timing can be set to a fixed value when the engine load is higher than the upper limit $W0+\alpha$, the timing is advanced as the load becomes higher in this embodiment as shown in FIG. 3. As a result, the amount of fuel that adheres to the wall of the cylinder 119 and dilutes the engine oil can be reduced even when the amount of injected fuel is increased with the load.

On the other hand, in the case where the temperature of the combustion chamber is high shown by the dotted line in FIG. 3, the fuel injection timing is advanced when the engine load is lower than the lower limit $W0-\alpha$, and the fuel injection timing is delayed when the engine load is higher than the upper limit $W0+\alpha$.

When the control is switched from the first control mode including steps S2 to S4 to the second control mode including steps S5 to S7 after the control routine shown in FIG. 2 is repeated and the temperature of the combustion chamber is increased, the fuel injection timing can be changed in accordance with the engine load at the time. However, a large difference in the fuel injection timing between before and after the change may cause a large difference in level of the torque. Therefore, the control mode is preferably switched at a predetermined engine load at the intersection of the solid line and the dotted line shown in FIG. 3 or near that intersection.

Alternatively, the control can be switched by gradually changing the fuel injection timing to a target timing, when the difference in the fuel injection timing between before and after the change is large. Yet alternatively, the control can be switched, for example, while the fuel injection is suspended, that is, during a fuel cut-off operation, when the difference in the fuel injection timing between before and after the change is large.

In accordance with the control device for the internal combustion engine according to this embodiment, the fuel injection timing is advanced when the demand for suppression of the particulate matter emission is relatively low and the demand for suppression of the engine oil dilution is relatively high, and the fuel injection timing is delayed when the demand for suppression of the particulate matter emission is relatively high and the demand for suppression of the engine oil dilution is relatively low. In this manner, the particulate matter emission and the engine oil dilution can be appropriately controlled.

Moreover, when the engine is operating under a high load while it is in the cold state, the fuel injection timing is advanced as the engine load becomes higher. As a result, the amount of fuel that adheres to the wall of the cylinder 119 and dilutes the engine oil can be reduced even when the amount of injected fuel is increased with the load.

Furthermore, to avoid a large change in torque during switching, the control can be switched between the first control mode and the second control mode, for example, in a load area where the fuel injection timing for the first control mode and that for the second control mode are approximately equal to each other, by gradually changing the fuel injection timing, or during a fuel cut-off operation.

The engine EG, the water temperature sensor 133, the crank angle sensor 131, and the engine control unit 11 are examples of an internal combustion engine, temperature detecting means, load detecting means, and control means, respectively, of the present invention.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A control device for an internal combustion engine of a spark-ignition type that injects fuel directly into a combustion chamber, the control device comprising:
    a temperature detector that detects the temperature of the combustion chamber to determine whether or not the temperature is lower than or equal to a predetermined temperature;
    a load detector that detects the load of the internal combustion engine to determine whether or not the load is higher than a predetermined load; and
    a controller that injects fuel based on (1) an oil dilution suppression map when the temperature is lower than or equal to the predetermined temperature, and injects fuel based on (2) a particulate matter emission suppression map when the temperature is greater than the predetermined temperature, wherein:
    (1) the oil dilution suppression map comprises:
        injecting fuel at 40 to 50 degrees after the top dead center when the load is higher than the predetermined load; and
        injecting fuel at 60 to 80 degrees after the top dead center when the load is equal to or lower than the predetermined load; and
    (2) the particulate matter emission suppression map comprises:
        injecting fuel at 80 to 90 degrees after the top dead center when the load is higher than the predetermined load; and
        injecting fuel at 40 to 50 degrees after the top dead center when the load is equal to or lower than the predetermined load.

2. The control device for an internal combustion engine according to claim 1, wherein the controller delays the fuel injection timing such that the timing of fuel injection is delayed compared with the timing when the load of the internal combustion engine is lower than or equal to the predetermined load.

3. The control device for an internal combustion engine according to claim 1, wherein the controller advances the timing of fuel injection as the load of the internal combustion engine increases when the load of the internal combustion engine is higher than the predetermined load such that the timing of fuel injection is advanced compared with the timing when the load of the internal combustion engine is lower than or equal to the predetermined load.

4. The control device for an internal combustion engine according to claim 1, wherein the controller delays the timing of fuel injection when the temperature of the combustion chamber is lower than or equal to the predetermined temperature and the load of the internal combustion engine is lower than or equal to the predetermined load compared with the timing when the temperature of the combustion chamber is higher than the predetermined temperature and the load of the internal combustion engine is lower than or equal to the predetermined load.

5. The control device for an internal combustion engine according to claim 1, wherein the load is varied over a predetermined range of load values.

6. The control device for an internal combustion engine according to claim 5, wherein the controller gradually changes the timing of fuel injection when the controller switches from the oil dilution suppression map to the particulate matter emission suppression map or from the particulate matter emission suppression map to the oil dilution suppression map.

7. The control device for an internal combustion engine according to claim 5, wherein the controller switches from the oil dilution suppression map to the particulate matter emission suppression map or from the particulate matter emission suppression map to the oil dilution suppression map while the fuel injection is suspended.

8. A control device for an internal combustion engine of a spark-ignition type that injects fuel directly into a combustion chamber, the control device comprising:
    temperature detecting means for detecting the temperature of the combustion chamber to determine whether or not the temperature is lower than or equal to a predetermined temperature;
    load detecting means for detecting the load of the internal combustion engine to determine whether or not the load is higher than a predetermined load; and
    control means that injects fuel based on (1) an oil dilution suppression map when the temperature is lower than or equal to the predetermined temperature, and injects fuel based on (2) a particulate matter emission suppression map when the temperature is greater than the predetermined temperature, wherein:
    (1) the oil dilution suppression map comprises:
        injecting fuel at 40 to 50 degrees after the top dead center when the load is higher than the predetermined load; and
        injecting fuel at 60 to 80 degrees after the top dead center when the load is equal to or lower than the predetermined load; and
    (2) the particulate matter emission suppression map comprises:
        injecting fuel at 80 to 90 degrees after the top dead center when the load is higher than the predetermined load; and
        injecting fuel at 40 to 50 degrees after the top dead center when the load is equal to or lower than the predetermined load.

9. A method for controlling an internal combustion engine of a spark-ignition type that injects fuel directly into a combustion chamber, the method comprising:
- detecting the temperature of the combustion chamber to determine whether or not the temperature is lower than or equal to a predetermined temperature;
- detecting the load of the internal combustion engine to determine whether or not the load is higher than a predetermined load; and
- injecting fuel based on (1) an oil dilution suppression map when the temperature is lower than or equal to the predetermined temperature, and injecting fuel based on (2) a particulate matter emission suppression map when the temperature is greater than the predetermined temperature, wherein:
- (1) the oil dilution suppression map comprises:
  - injecting fuel at 40 to 50 degrees after the top dead center when the temperature is equal to or lower than the predetermined temperature and the load is higher than the predetermined load; and
  - injecting fuel at 60 to 80 degrees after the top dead center when the temperature is equal to or lower than the predetermined temperature and the load is equal to or lower than the predetermined load; and
- (2) the particulate matter em map comprises:
  - injecting fuel at 80 to 90 degrees after the top dead center when the load is higher than the predetermined load; and
  - injecting fuel at 40 to 50 degrees after the top dead center when the temperature is higher than the predetermined temperature and the load is equal to or lower than the predetermined load.

10. The method for controlling an internal combustion engine according to claim 9, the method further comprising delaying the fuel injection timing such that the timing of fuel injection is delayed compared with the timing when the load of the internal combustion engine is lower than or equal to the predetermined load.

11. The method for controlling an internal combustion engine according to claim 9, the method further comprising advancing the timing of fuel injection as the load of the internal combustion engine increases when the load of the internal combustion engine is higher than the predetermined load such that the timing of fuel injection is advanced compared with the timing when the load of the internal combustion engine is lower than or equal to the predetermined load.

12. The method for controlling an internal combustion engine according to claim 9, the method further comprising delaying the timing of fuel injection when the temperature of the combustion chamber is lower than or equal to the predetermined temperature and the load of the internal combustion engine is lower than or equal to the predetermined load as compared with the timing when the temperature of the combustion chamber is higher than the predetermined temperature and the load of the internal combustion engine is lower than or equal to the predetermined load.

13. The method for controlling an internal combustion engine according to claim 9, wherein the load is varied over a predetermined range of load values.

14. The method for controlling an internal combustion engine according to claim 13, the method further comprising gradually changing the timing of fuel injection during switching from the oil dilution suppression map to the particulate matter emission suppression map or from the particulate matter emission suppression map to the oil dilution suppression map.

15. The method for controlling an internal combustion engine according to claim 13, the method further comprising switching from the oil dilution suppression map to the particulate matter emission suppression map or from the particulate matter emission suppression map to the oil dilution suppression map while the fuel injection is suspended.

* * * * *